(12) United States Patent
Tran (10) Patent No.: US 10,990,328 B2
(45) Date of Patent: Apr. 27, 2021

(54) IMAGE FORMING APPARATUS

(71) Applicant: KYOCERA Document Solutions Inc., Osaka (JP)

(72) Inventor: Van Binh Tran, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 103 days.

(21) Appl. No.: 16/413,887

(22) Filed: May 16, 2019

(65) Prior Publication Data

US 2019/0354319 A1 Nov. 21, 2019

(30) Foreign Application Priority Data

May 17, 2018 (JP) .............................. JP2018-095495

(51) Int. Cl.
*G06F 3/12* (2006.01)

(52) U.S. Cl.
CPC .......... *G06F 3/1204* (2013.01); *G06F 3/1205* (2013.01); *G06F 3/1221* (2013.01); *G06F 3/1259* (2013.01); *G06F 3/1267* (2013.01)

(58) Field of Classification Search
CPC .... G06F 3/1204; G06F 3/1205; G06F 3/1267; G06F 3/1259; G06F 3/1221; G06F 3/1229; G06F 3/1274; Y02D 10/00
See application file for complete search history.

(56) References Cited

U.S. PATENT DOCUMENTS

2013/0083338 A1* 4/2013 Fahrenkrug ........ G03G 15/5004
358/1.13
2017/0139580 A1* 5/2017 Kimura .............. G03G 15/5016

FOREIGN PATENT DOCUMENTS

JP 2001-293932 A 10/2001

* cited by examiner

*Primary Examiner* — Neil R McLean
(74) *Attorney, Agent, or Firm* — Studebaker & Brackett PC (57) ABSTRACT

An image forming apparatus includes a switch, a receiving section, an acquisition section, a determination section, and a transition section. The receiving section receives an operation on the switch. The acquisition section acquires operation state information indicating a first operation state. The determination section determines a second operation state based on the operation state information. The second operation state differs from the first operation state. The transition section causes the image forming apparatus to transition from the first operation state to the second operation state in response to the operation on the switch. The first operation state is a state in which the image forming apparatus is operating. The second operation state is a state in which the image forming apparatus is to operate.

9 Claims, 9 Drawing Sheets

IMAGE FORMING APPARATUS

INCORPORATION BY REFERENCE

The present application claims priority under 35 U.S.C. § 119 to Japanese Patent Application No. 2018-095495, filed on May 17, 2018. The contents of this application are incorporated herein by reference in their entirety.

BACKGROUND

The present disclosure relates to an image forming apparatus.

A printer system includes a printer and a personal computer. The printer performs a printing operation based on print data transmitted from the personal computer. The printer includes a power key, a central processing unit (CPU), and an application-specific integrated circuit (ASIC). The ASIC has a buffer region and an error information storage region. When the power key of the printer is operated during printing operation, the CPU stops the printing operation while a power source remains in an on state. Further, the CPU deletes print data stored in the buffer region of the ASIC and writes cancel information in the error information storage region of the ASIC. The personal computer includes buffer memory. When the personal computer confirms the cancel information in the error information storage region of the printer, the personal computer deletes the print data stored in the buffer memory of the personal computer.

SUMMARY

An image forming apparatus according to an aspect of the present disclosure includes a key, a receiving section, an acquisition section, a determination section, and a transition section. The receiving section receives operation on the key. The acquisition section acquires operation state information indicating a first operation state. The determination section determines a second operation state based on the operation state information. The second operation state differs from the first operation state. The transition section causes the image forming apparatus to transition from the first operation state to the second operation state. The first operation state is a state in which the image forming apparatus is operating. The second operation state is a state in which the image forming apparatus is to operate.

DETAILED DESCRIPTION

The following describes an embodiment of the present disclosure with reference to the accompanying drawings (FIGS. 1 to 9). It should be noted that elements in the drawings that are the same or equivalent are labelled using the same reference signs and description thereof is not repeated.

Figure 1:
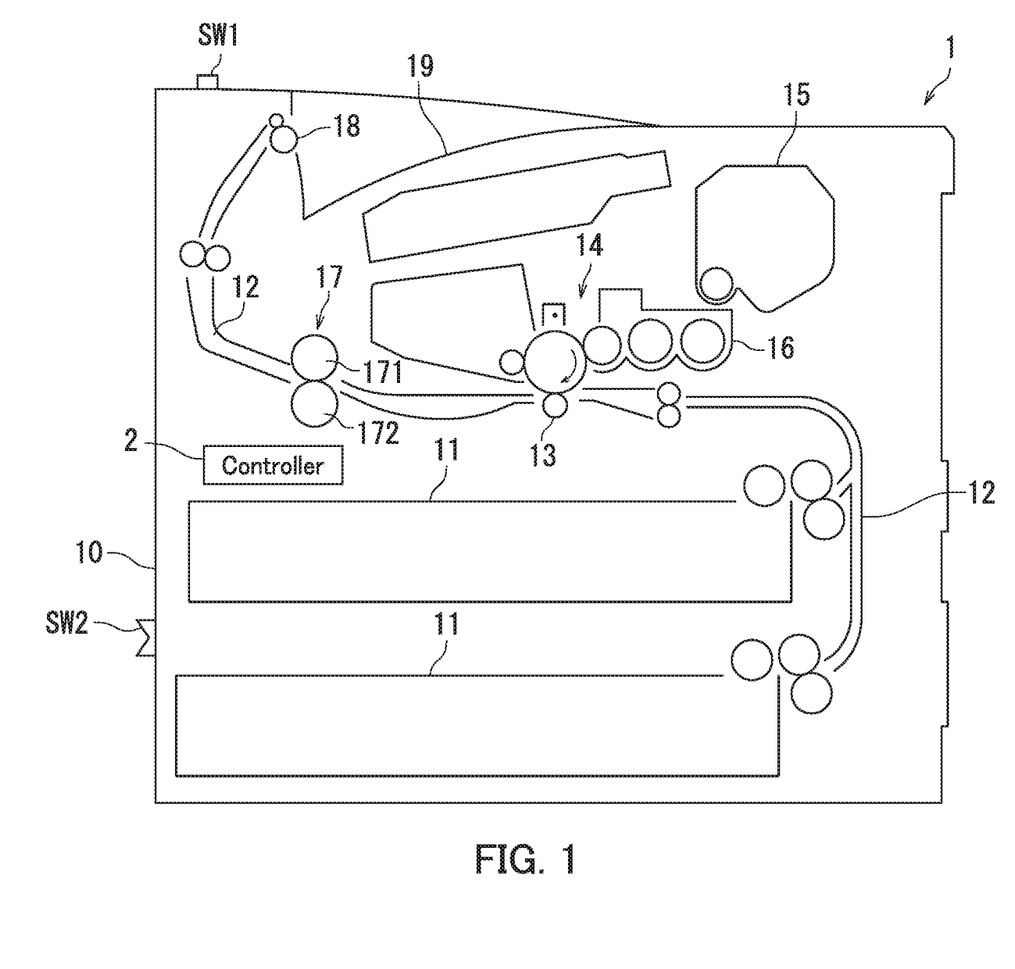
FIG. 1 is a diagram illustrating a configuration of an image forming apparatus according to an embodiment of the present disclosure.

The following first describes an image forming apparatus 1 according to the embodiment of the present disclosure with reference to FIG. 1. FIG. 1 is a diagram illustrating a configuration of the image forming apparatus 1. As illustrated in FIG. 1, the image forming apparatus 1 is a printer. The image forming apparatus 1 includes a casing 10, a sheet feeding cassette 11, a conveyance section 12, an image forming section 14, a toner container 15, a fixing section 17, an ejection section 18, an exit tray 19, a controller 2, a first switch SW1, and a second switch SW2. The image forming section 14 includes a transfer section 13 and a developing section 16.

The casing 10 houses the sheet feeding cassette 11, the conveyance section 12, the image forming section 14, the toner container 15, the fixing section 17, the ejection section 18, and the controller 2.

The sheet feeding cassette 11 feeds a sheet to the conveyance section 12. The conveyance section 12 conveys the sheet to the ejection section 18 via the transfer section 13 and the fixing section 17. The sheet is equivalent to an example of a "recording medium".

The image forming section 14 forms an image on the sheet. The image forming section 14 includes a photosensitive drum. An electrostatic latent image is formed on the photosensitive drum. The toner container 15 contains toner. The toner container 15 replenishes the developing section 16 with toner. The developing section 16 supplies toner to the electrostatic latent image to develop the electrostatic latent image into a toner image. The transfer section 13 transfers the toner image formed on the photosensitive drum to the sheet. Through the above, an image is formed on the sheet.

The fixing section 17 includes a heating roller 171 and a pressure roller 172. The fixing section 17 applies heat and pressure to the sheet by nipping the sheet between the heating roller 171 and the pressure roller 172 to fix the image formed on the sheet to the sheet. The ejection section 18 ejects the sheet onto the exit tray 19. The sheet ejected by the ejection section 18 is placed on the exit tray 19.

The controller 2 controls operation of the image forming apparatus 1. The controller 2 includes a processor 21 and storage 22. The processor 21 includes for example a central processing unit (CPU). The storage 22 includes memory such as semiconductor memory and may include a hard disk drive (HDD). The storage 22 stores a control program therein. The processor 21 controls the operation of the image forming apparatus 1 by executing the control program.

The first switch SW1 is a power switch of push button type. The first switch SW1 is in a position where user operation is easy. The first switch SW1 is located for example at an end of an upper surface of the casing 10. The first switch SW1 is equivalent to an example of a "key".

The second switch SW2 is a power switch of seesaw type. The "key" may be capable of switching power supply on and off. The second switch SW2 is in a position where user operation is not as easy as the position of the first switch SW1. The second switch SW2 is located for example at a lower part of a side surface of the casing 10. The second switch SW2 is equivalent to an example of a "power switch". The first switch SW1 and the second switch SW2 will be described later in detail with reference to FIG. 2.

Figure 2:
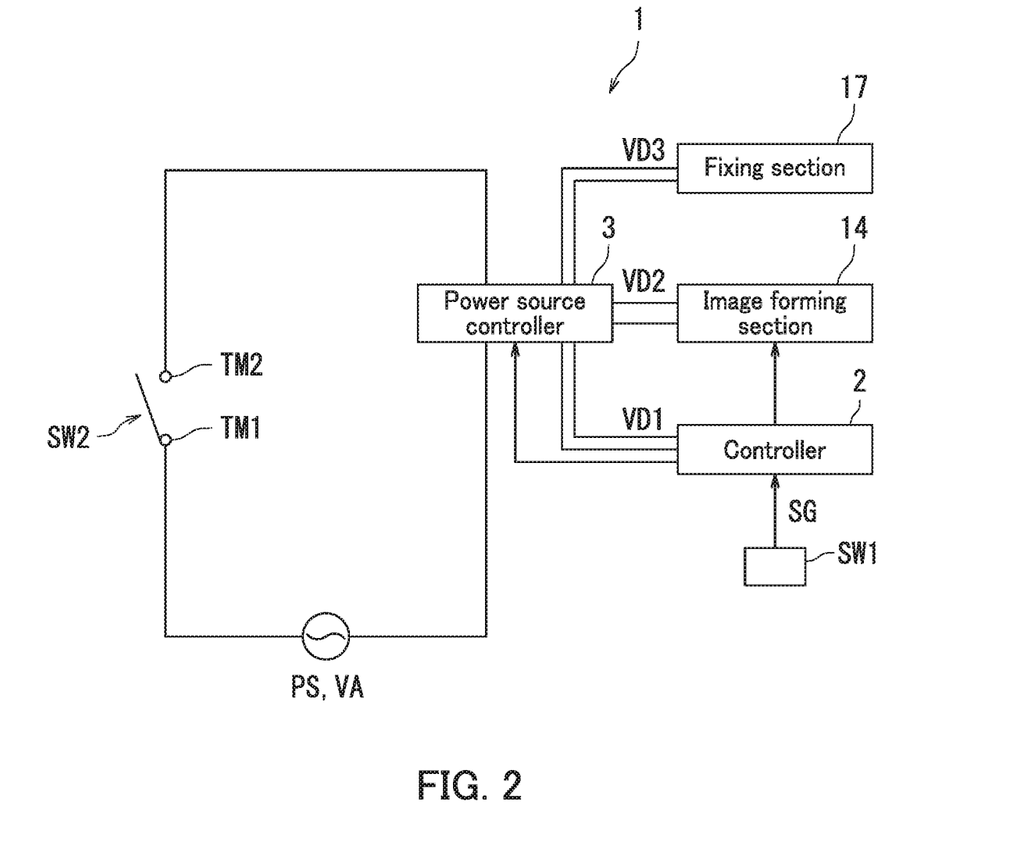
FIG. 2 is a diagram illustrating an example of a configuration of a power supply system of the image forming apparatus.

The following describes a configuration of a power supply system of the image forming apparatus 1 with reference to FIGS. 1 and 2. FIG. 2 is a diagram illustrating an example of the configuration of the power supply system of the image forming apparatus 1. As illustrated in FIG. 2, the image forming apparatus 1 further includes a power source controller 3.

The power source controller 3 supplies electric power to each section of the image forming apparatus 1. Specifically, the power source controller 3 supplies a first direct current voltage VD1 to the controller 2. The power source controller 3 also supplies a second direct current voltage VD2 to the image forming section 14. The power source controller 3 supplies a third direct current voltage VD3 to the fixing section 17. The first direct current voltage VD1 is for example 5 V. The second direct current voltage VD2 is for example 500 V. The third direct current voltage VD3 is for example 100 V.

A commercial power source PS supplies an alternating current voltage VA to the power source controller 3. The alternating current voltage VA is for example 100 V. The second switch SW2 is disposed in a circuit for supplying electric power from the commercial power source PS to the power source controller 3.

The second switch SW2 has a first terminal TM1 and a second terminal TM2.

When the second switch SW2 is turned on, electric power is supplied from the commercial power source PS to the power source controller 3 due to conduction between the first terminal TM1 and the second terminal TM2. In this state, the electric power is supplied from the commercial power source PS to the image forming apparatus 1. By contrast, when the second switch SW2 is turned off, conduction between the first terminal TM1 and the second terminal TM2 is cut off to cut off electric power supply from the commercial power source PS to the power source controller 3. In this state, the electric power is not supplied from the commercial power source PS to the image forming apparatus 1.

The first switch SW1 transmits an operation signal SG to the controller 2. The controller 2 controls the power source controller 3 based on the operation signal SG. For example, in order to set the image forming apparatus 1 into an activation state STC, the controller 2 directs the power source controller 3 to supply the first direct current voltage VD1 to the controller 2, to supply the second direct current voltage VD2 to the image forming section 14, and to supply the third direct current voltage VD3 to the fixing section 17. By contrast, for example, in order to set the image forming apparatus 1 into a sleep state STD, the controller 2 directs the power source controller 3 to supply the first direct current voltage VD1 to the controller 2, to supply the third direct current voltage VD3 to the fixing section 17, and not to supply the second direct current voltage VD2 to the image forming section 14. The activation state STC and the sleep state STD will be described later in detail with reference to FIG. 4.

As described with reference to FIGS. 1 and 2, the first switch SW1 and the second switch SW2, which differs from the first switch SW1, are provided in the embodiment of the present disclosure. When the second switch SW2 is turned off, electric power supply to the image forming apparatus 1 is restricted. The first switch SW1 is a switch for controlling electric power supply. For example, the first switch SW1 does not stop electric power supply to the controller 2. In the above configuration, the first switch SW1 and the second switch SW2 have different functions, thereby allowing a user to effectively utilize the first switch SW1 and the second switch SW2. Thus, user convenience can be increased.

Note that the "key" is a power switch of push button type in the embodiment of the present disclosure, which should not be taken to limit the present disclosure. It is only required that the operation signal SG be transmitted to the controller 2 in response to user operation. For example, the "key" may be a hard key.

The second switch SW2 is a power switch of seesaw type in the embodiment of the present disclosure, which should not be taken to limit the present disclosure. It is only required that the second switch SW2 be a power switch. For example, the second switch SW2 may be a slide power switch or a toggle switch.

Figure 3:
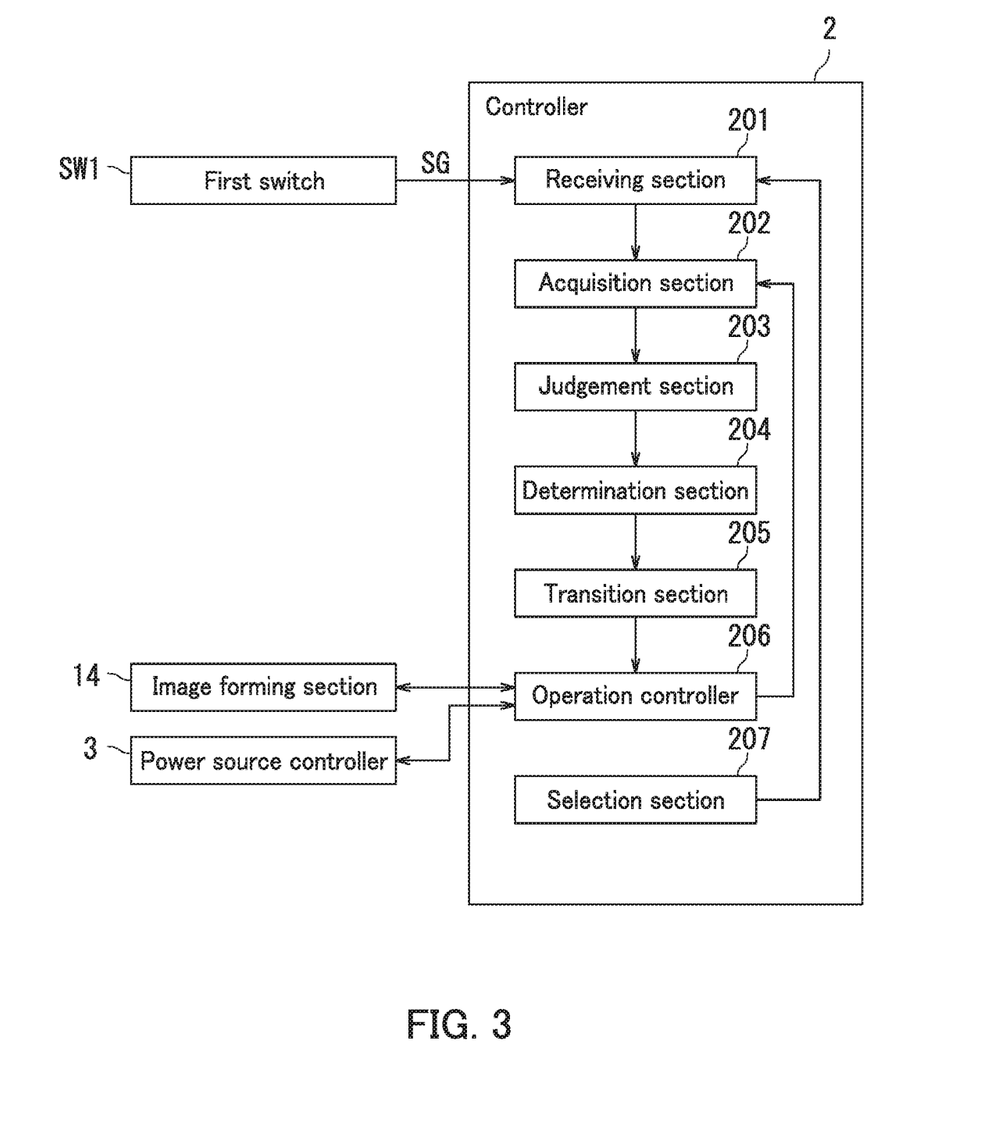
FIG. 3 is a diagram illustrating an example of a configuration of a controller according to an embodiment of the present disclosure.

The following describes a configuration of the controller 2 according to the embodiment of the present disclosure with reference to FIGS. 1 to 3. FIG. 3 is a diagram illustrating an example of the configuration of the controller 2. As illustrated in FIG. 3, the controller 2 includes a receiving section 201, an acquisition section 202, a judgement section 203, a determination section 204, a transition section 205, an operation controller 206, and a selection section 207. Specifically, the processor 21 of the controller 2 functions as the receiving section 201, the acquisition section 202, the judgement section 203, the determination section 204, the transition section 205, the operation controller 206, and the selection section 207 by executing the control program.

The receiving section 201 receives user operation on the first switch SW1. Specifically, the receiving section 201 receives the operation signal SG generated by the first switch SW1.

The acquisition section 202 acquires operation state information STJ from the operation controller 206 upon the receiving section 201 receiving the user operation. The operation state information STJ indicates a first operation state ST1. The first operation state ST1 is a current state in which the image forming apparatus 1 is operating.

The judgement section 203 judges whether the user operation is a first operation QP1 or a second operation QP2 based on the operation signal SG. The second operation QP2 differs from the first operation QP1 in at least one of the number N of times and a duration TL. The number N of times is the number of times that the first switch SW1 has been pressed within a specific period TA. The duration TL is the duration for which the first switch SW1 is continuously pressed. The first operation QP1 is for example an operation in which the first switch SW1 is pressed one time. The second operation QP2 is for example an operation in which the first switch SW1 is pressed two times within the specific period TA. The specific period TA is for example two seconds. The second operation QP2 may be an operation in which the first switch SW1 is pressed three times or more within the specific period TA. The specific period TA may for example be longer than two seconds.

The determination section 204 identifies the first operation state ST1 based on the operation state information STJ.

The determination section 204 also determines the second operation state ST2 based on the operation state information STJ and a result of judgement by the judgement section 203. The second operation state ST2 is a state in which the image forming apparatus 1 is to operate. The second operation state ST2 differs from the first operation state ST1.

The transition section 205 causes the image forming apparatus 1 to transition from the first operation state ST1 to the second operation state ST2 in response to the user operation on the first switch SW1.

The operation controller 206 controls the operation of the image forming apparatus 1 according to an instruction from the transition section 205. That is, the operation controller 206 performs transition processing of causing the image forming apparatus 1 to transition from the first operation state ST1 to the second operation state ST2. The operation controller 206 controls for example operation of the image forming section 14 illustrated in FIG. 1 and operation of the power source controller 3 illustrated in FIG. 2.

The acquisition section 202, the judgement section 203, the determination section 204, the transition section 205, and the operation controller 206 will be described later in detail with reference to FIGS. 4 to 9.

The selection section 207 selects at least one operation from among the first operation QP1 and the second operation QP2. The receiving section 201 receives an operation selected by the selection section 207.

As described with reference to FIGS. 1 to 3, the determination section 204 determines the second operation state ST2 based on the operation state information STJ and the operation on the first switch SW1 in the embodiment of the present disclosure. The transition section 205 causes the image forming apparatus 1 to transition from the first operation state ST1 to the second operation state ST2. In the above configuration, user operation on the first switch SW1 can cause operation state transition of the image forming apparatus 1. Thus, user convenience can be increased.

The judgement section 203 judges whether the user operation is the first operation QP1 or the second operation QP2. The determination section 204 determines the second operation state ST2 based on the operation state information STJ and a result of judgement by the judgement section 203. In the above configuration, operation state transition of the image forming apparatus 1 can be caused by the first operation QP1 or the second operation QP2 on the first switch SW1. Thus, the second operation state ST2 determined when the operation is the first operation QP1 can differ from the second operation state ST2 determined when the operation is the second operation QP2. Thus, user convenience can further be increased.

The selection section 207 selects at least one user operation from among the first operation QP1 and the second operation QP2. The receiving section 201 receives the user operation selected by the selection section 207. In the above configuration, the second operation state ST2 (operation state as a transition target) of the image forming apparatus 1 can be selected according to the user operation on the first switch SW1. Thus, user convenience can further be increased.

When the selection section 207 selects for example only the first operation QP1, the receiving section 201 receives the first operation QP1 and does not receive the second operation QP2. In the above case, the second operation state ST2 of the image forming apparatus 1 can be selected through the user performing the first operation QP1.

Alternatively, when the selection section 207 selects for example only the second operation QP2, the receiving section 201 receives the second operation QP2 and does not receive the first operation QP1. In the above case, the second operation state ST2 of the image forming apparatus 1 can be selected through the user performing the second operation QP2.

Furthermore, when the selection section 207 selects for example the first operation QP1 and the second operation QP2, the receiving section 201 receives the first operation QP1 and the second operation QP2. In the above case, the second operation state ST2 of the image forming apparatus 1 can be selected through the user performing the first operation QP1 or the second operation QP2.

As described above, transition of the operation state of the image forming apparatus 1 can be differentiated among a case where the selection section 207 selects only the first operation QP1, a case where the selection section 207 selects only the second operation QP2, and a case where the selection section 207 selects the first operation QP1 and the second operation QP2. Thus, user convenience can further be increased.

Figure 4:
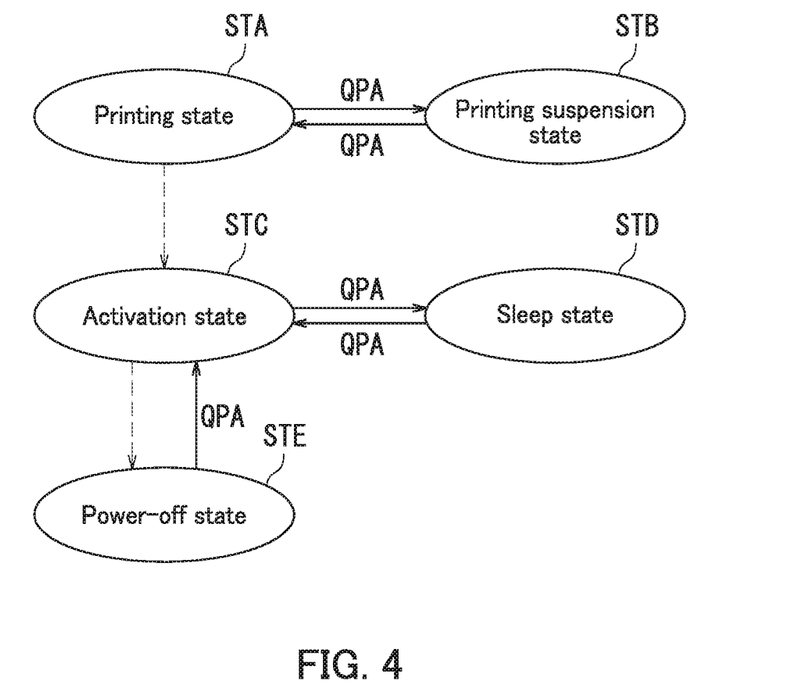
FIG. 4 is a transition diagram illustrating an example of transition of an operation state of the image forming apparatus.
Figure 5:
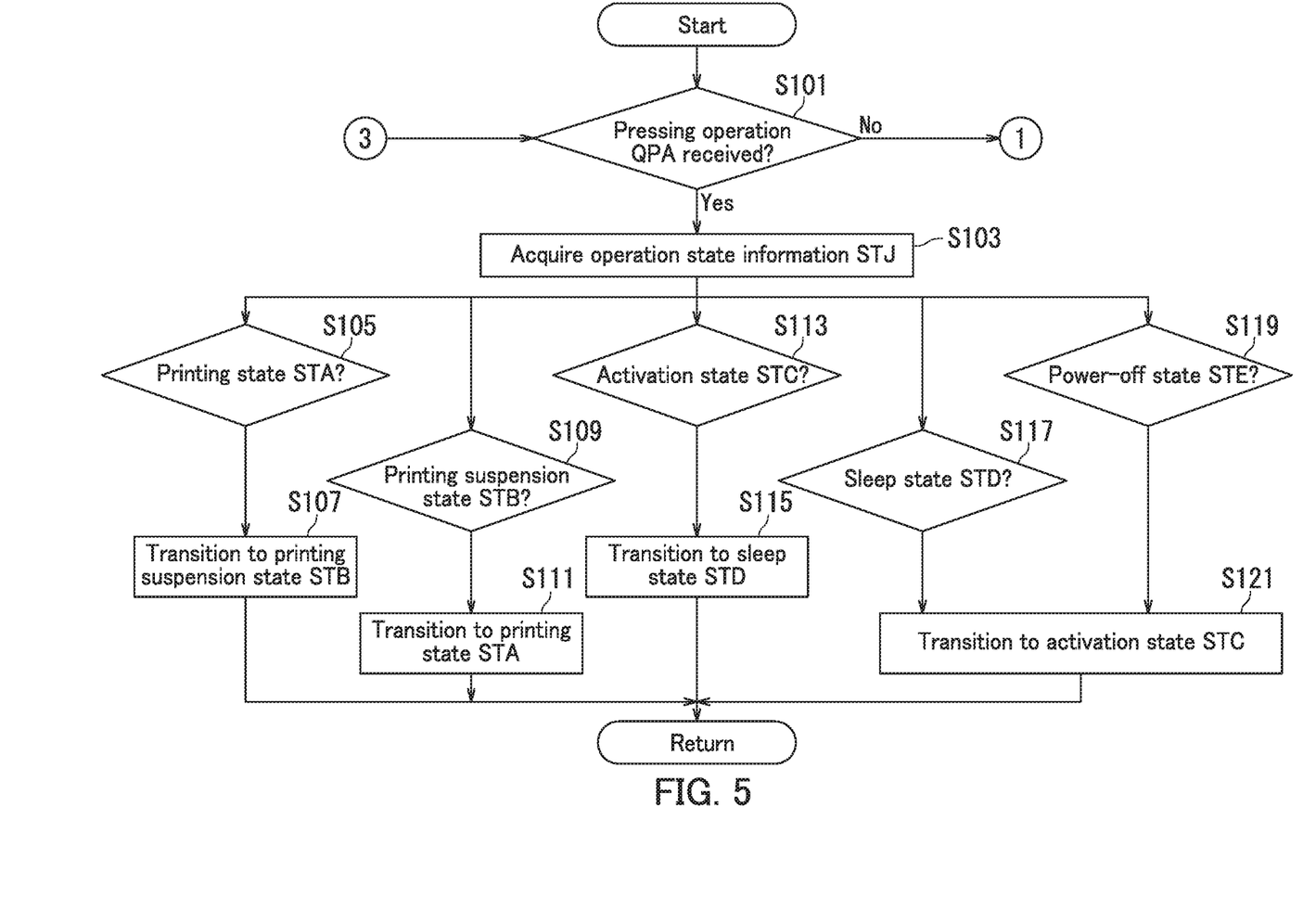
FIG. 5 is a flowchart depicting an example of a process performed by the controller.

The following further describes the operation of the controller 2 with reference to FIGS. 3 to 5. FIG. 4 is a transition diagram illustrating an example of transition of the operation state of the image forming apparatus 1 upon receipt of a pressing operation QPA. The pressing operation QPA is an operation in which the first switch SW1 is pressed only one time. The duration of the pressing operation QPA for which the first switch SW1 is pressed is less than the specific period TA. The specific period TA is for example one second. The pressing operation QPA is equivalent to an example of the first operation QP1.

In the following, a case where the first operation QP1 and the second operation QP2 are under selection by the selection section 207 is described. Specifically, a case where the pressing operation QPA, a long pressing operation QPB, and a double pressing operation QPC are under selection by the selection section 207 is described. Accordingly, the judgement section 203 determines whether the user operation is the pressing operation QPA, the long pressing operation QPB, or the double pressing operation QPC. The long pressing operation QPB will be described later with reference to FIG. 6. The double pressing operation QPC will be described later with reference to FIG. 8.

As illustrated in FIG. 4, each of the first operation state ST1 and the second operation state ST2 includes a printing state STA, a printing suspension state STB, the activation state STC, the sleep state STD, and a power-off state STE.

The printing state STA is a state in which the image forming apparatus 1 is executing a print job. In the printing state STA, electric power is supplied for example to the controller 2, the power source controller 3, the image forming section 14, and the fixing section 17.

The printing suspension state STB is a state in which the image forming apparatus 1 is suspended from executing a print job. In the printing suspension state STB, electric power is supplied for example to the controller 2, the power source controller 3, the image forming section 14, and the fixing section 17.

The activation state STC is a state in which the image forming apparatus 1 is not executing a print job under a condition in which the image forming apparatus 1 is ready to execute a print job. In the activation state STC, electric power is supplied for example to the controller 2, the power source controller 3, the image forming section 14, and the fixing section 17.

The sleep state STD is a state in which electric power being consumed by the image forming apparatus 1 is reduced. In the sleep state STD, for example, electric power is not supplied to the image forming section 14 but is supplied to the power source controller 3, the controller 2, and the fixing section 17.

The power-off state STE is a state in which electric power being consumed by the image forming apparatus 1 is further reduced than in the sleep state STD. In the power-off state STE, for example, electric power is not supplied to the image forming section 14 and the fixing section 17 but is supplied to the power source controller 3 and the controller 2.

Upon the receiving section 201 receiving the pressing operation QPA in a situation in which the first operation state ST1 is the printing state STA, the determination section 204 determines the second operation state ST2 to be the printing suspension state STB. The transition section 205 then causes the image forming apparatus 1 to transition from the printing state STA to the printing suspension state STB. The operation controller 206 performs transition processing of causing the image forming apparatus 1 to transition from the printing state STA to the printing suspension state STB.

Upon the receiving section 201 receiving the pressing operation QPA in a situation in which the first operation state ST1 is the printing suspension state STB, the determination section 204 determines the second operation state ST2 to be the printing state STA. The transition section 205 then causes the image forming apparatus 1 to transition from the printing suspension state STB to the printing state STA. The operation controller 206 performs transition processing of causing the image forming apparatus 1 to transition from the printing suspension state STB to the printing state STA.

Upon an end of execution of a print job in the situation in which the first operation state ST1 is the printing state STA, the controller 2 causes the image forming apparatus 1 to transition from the printing state STA to the activation state STC. That is, the controller 2 performs transition processing of causing the image forming apparatus 1 to transition from the printing state STA to the activation state STC.

Upon the receiving section 201 receiving the pressing operation QPA in a situation in which the first operation state ST1 is the activation state STC, the determination section 204 determines the second operation state ST2 to be the sleep state STD. The transition section 205 then causes the image forming apparatus 1 to transition from the activation state STC to the sleep state STD. The operation controller 206 performs transition processing of causing the image forming apparatus 1 to transition from the activation state STC to the sleep state STD.

Upon the receiving section 201 receiving the pressing operation QPA in a situation in which the first operation state ST1 is the sleep state STD, the determination section 204 determines the second operation state ST2 to be the activation state STC. The transition section 205 then causes the image forming apparatus 1 to transition from the sleep state STD to the activation state STC. The operation controller 206 performs transition processing of causing the image forming apparatus 1 to transition from the sleep state STD to the activation state STC.

Upon the receiving section 201 receiving the pressing operation QPA in a situation in which the first operation state ST1 is the power-off state STE, the determination section 204 determines the second operation state ST2 to be the activation state STC. The transition section 205 then causes the image forming apparatus 1 to transition from the power-off state STE to the activation state STC. The operation controller 206 performs transition processing of causing the image forming apparatus 1 to transition from the power-off state STE to the activation state STC.

When the controller 2 receives neither an operation nor a print job for a specific period TC in a situation in which the first operation state ST1 is the activation state STC, the controller 2 causes the image forming apparatus 1 to transition from the activation state STC to the power-off state STE. That is, the controller 2 performs transition processing of causing the image forming apparatus 1 to transition from the activation state STC to the power-off state STE. The specific period TC is for example 10 minutes.

FIG. 5 is a flowchart depicting an example of a process performed by the controller 2 in response to receipt of a pressing operation QPA.

As depicted in FIG. 5, the judgement section 203 determines in Step S101 whether or not the receiving section 201 has received the pressing operation QPA.

Figure 7:
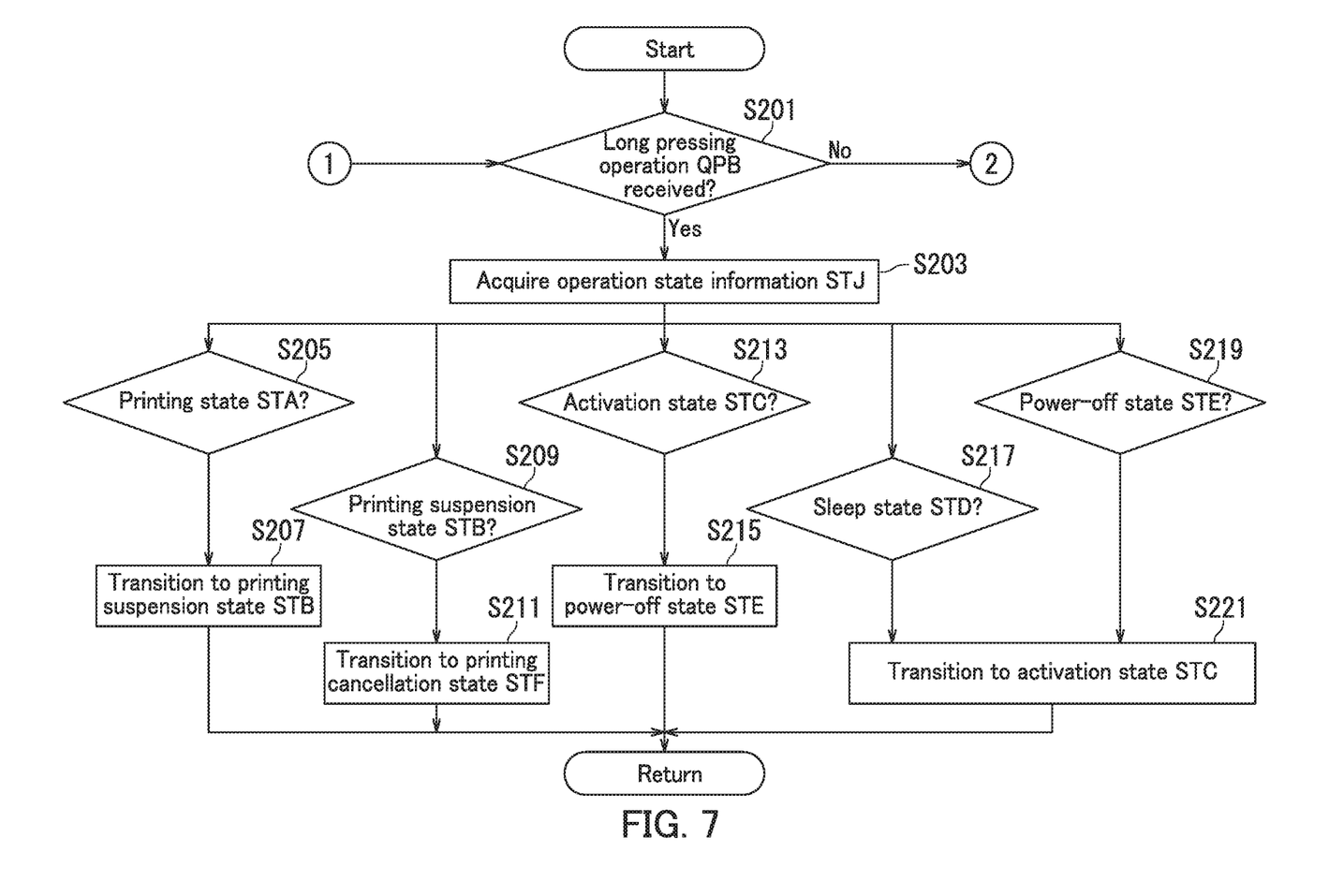
FIG. 7 is a flowchart depicting an example of a process performed by the controller.

When the judgement section 203 judges that the pressing operation QPA has not been received (No in Step S101), the routine proceeds to Step S201 in FIG. 7.

When the judgement section 203 determines the pressing operation QPA has been received (Yes in Step S101), the routine proceeds to Step S103.

In Step S103, the acquisition section 202 acquires the operation state information STJ from the operation controller 206. The routine then proceeds to Steps S105, S109, S113, S117, and S119. The operation state information STJ indicates the first operation state ST1.

In Step S105, the determination section 204 determines whether or not the first operation state ST1 is the printing state STA.

When the determination section 204 identifies the first operation state ST1 as the printing state STA, the routine proceeds to Step S107.

In Step S107, the determination section 204 determines the second operation state ST2 to be the printing suspension state STB and the transition section 205 causes the image forming apparatus 1 to transition from the printing state STA to the printing suspension state STB. The operation controller 206 performs the transition processing of causing the image forming apparatus 1 to transition from the printing state STA to the printing suspension state STB. The routine then returns to Step S101.

In Step S109, the determination section 204 determines whether or not the first operation state ST1 is the printing suspension state STB.

When the determination section 204 identifies the first operation state ST1 as the printing suspension state STB, the routine proceeds to Step S111.

In Step S111, the determination section 204 determines the second operation state ST2 to be the printing state STA and the transition section 205 causes the image forming apparatus 1 to transition from the printing suspension state STB to the printing state STA. The operation controller 206 performs the transition processing of causing the image forming apparatus 1 to transition from the printing suspension state STB to the printing state STA. The routine then returns to Step S101.

In Step S113, the determination section 204 determines whether or not the first operation state ST1 is the activation state STC.

When the determination section 204 identifies the first operation state ST1 as the activation state STC, the routine proceeds to Step S115.

In Step S115, the determination section 204 determines the second operation state ST2 to be the sleep state STD and the transition section 205 causes the image forming apparatus 1 to transition from the activation state STC to the sleep state STD. The operation controller 206 performs the transition processing of causing the image forming apparatus 1 to transition from the activation state STC to the sleep state STD. The routine then returns to Step S101.

In Step S117, the determination section 204 determines whether or not the first operation state ST1 is the sleep state STD.

When the determination section 204 identifies the first operation state ST1 as the sleep state STD, the routine proceeds to Step S121.

In Step S121, the determination section 204 determines the second operation state ST2 to be the activation state STC and the transition section 205 causes the image forming apparatus 1 to transition from the sleep state STD to the activation state STC. The operation controller 206 performs the transition processing of causing the image forming apparatus 1 to transition from the sleep state STD to the activation state STC. The routine then returns to Step S101.

In Step S119, the determination section 204 determines whether or not the first operation state ST1 is the power-off state STE.

When the determination section 204 identifies the first operation state ST1 as the power-off state STE, the routine proceeds to Step S121.

In Step S121, the determination section 204 determines the second operation state ST2 to be the activation state STC and the transition section 205 causes the image forming apparatus 1 to transition from the power-off state STE to the activation state STC. The operation controller 206 performs the transition processing of causing the image forming apparatus 1 to transition from the power-off state STE to the activation state STC. The routine then returns to Step S101.

As described with reference to FIGS. 3 to 5, in the embodiment of the present disclosure, the determination section 204 determines the second operation state ST2 to be the printing suspension state STB when the first operation state ST1 is the printing state STA, and determines the second operation state ST2 to be the printing state STA when the first operation state ST1 is the printing suspension state STB. In the above configuration, alternate transition between the printing state STA and the printing suspension state STB can be achieved through the pressing operation QPA on the first switch SW1. Thus, user convenience can further be increased.

Furthermore, the determination section 204 determines the second operation state ST2 to be the sleep state STD when the first operation state ST1 is the activation state STC, and determines the second operation state ST2 to be the activation state STC when the first operation state ST1 is the sleep state STD. In the above configuration, alternate transition between the activation state STC and the sleep state STD can be achieved through the pressing operation QPA on the first switch SW1. Thus, user convenience can further be increased.

Figure 6:
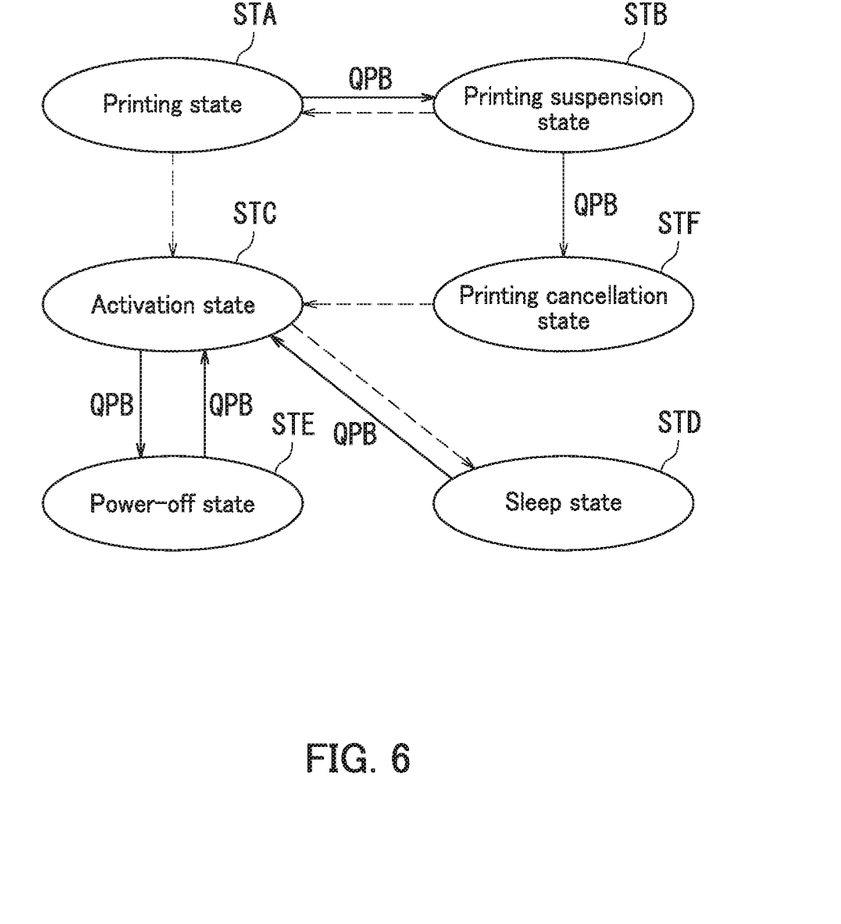
FIG. 6 is a transition diagram illustrating an example of transition of the operation state of the image forming apparatus.

The following further describes the configuration of the controller 2 with reference to FIGS. 3 to 7. FIG. 6 is a transition diagram illustrating an example of transition of the operation state of the image forming apparatus 1 in response to receipt of a long pressing operation QPB. The long pressing operation QPB is an operation in which the first switch SW1 is pressed only one time. Furthermore, the duration of the long pressing operation QPB for which the first switch SW1 is pressed is a specific period TB or longer. The specific period TB is for example two seconds. The long pressing operation QPB is equivalent to an example of the second operation QP2.

As illustrated in FIG. 6, each of the first and second operation states ST1 and ST2 of the image forming apparatus 1 further includes a printing cancellation state STF in addition to the printing state STA, the printing suspension state STB, the activation state STC, the sleep state STD, and the power-off state STE illustrated in FIG. 4.

The printing cancellation state STF is a state in which the image forming apparatus 1 is cancelling a print job. That is, the image forming apparatus 1 cancels a print job in the printing cancellation state STF. In the printing cancellation state STF, electric power is supplied for example to the controller 2, the power source controller 3, the image forming section 14, and the fixing section 17.

Upon an end of a process of cancelling a print job in the printing cancellation state STF, the controller 2 causes transition from the printing cancellation state STF to the activation state STC. The operation controller 206 executes transition processing of causing the image forming apparatus 1 to transition from the printing cancellation state STF to the activation state STC.

Upon the receiving section 201 receiving the long pressing operation QPB in a situation in which the first operation state ST1 is the printing state STA, the determination section 204 determines the second operation state ST2 to be the printing suspension state STB. The transition section 205 then causes the image forming apparatus 1 to transition from the printing state STA to the printing suspension state STB. The operation controller 206 performs the transition processing of causing the image forming apparatus 1 to transition from the printing state STA to the printing suspension state STB.

When the controller 2 receives neither an operation nor a print job for a specific period TD in a situation in which the first operation state ST1 is the printing suspension state STB, the controller 2 causes the image forming apparatus 1 to transition from the printing suspension state STB to the printing state STA. That is, the controller 2 performs the transition processing of causing the image forming apparatus 1 to transition from the printing suspension state STB to the printing state STA. The specific period TD is for example 10 minutes.

Upon an end of execution of a print job in a situation in which the first operation state ST1 is the printing state STA, the controller 2 causes the image forming apparatus 1 to transition from the printing state STA to the activation state STC. That is, the controller 2 performs the transition processing of causing the image forming apparatus 1 to transition from the printing state STA to the activation state STC.

Upon the receiving section 201 receiving the long pressing operation QPB in a situation in which the first operation state ST1 is the activation state STC, the determination section 204 determines the second operation state ST2 to be the power-off state STE. The transition section 205 then causes the image forming apparatus 1 to transition from the activation state STC to the power-off state STE. The operation controller 206 performs the transition processing of causing the image forming apparatus 1 to transition from the activation state STC to the power-off state STE.

Upon the receiving section 201 receiving the long pressing operation QPB in a situation in which the first operation state ST1 is the power-off state STE, the determination section 204 determines the second operation state ST2 to be the activation state STC. The transition section 205 then causes the image forming apparatus 1 to transition from the power-off state STE to the activation state STC. The operation controller 206 performs the transition processing of causing the image forming apparatus 1 to transition from the power-off state STE to the activation state STC.

Upon the receiving section 201 receiving the long pressing operation QPB in a situation in which the first operation state ST1 is the sleep state STD, the determination section 204 determines the second operation state ST2 to be the activation state STC. The transition section 205 then causes the image forming apparatus 1 to transition from the sleep state STD to the activation state STC. The operation controller 206 performs the transition processing of causing the image forming apparatus 1 to transition from the sleep state STD to the activation state STC.

When the controller 2 receives neither an operation nor a print job for a specific period TE in a situation in which the first operation state ST1 is the activation state STC, the controller 2 causes the image forming apparatus 1 to transition from the activation state STC to the sleep state STD. That is, the controller 2 performs the transition processing of causing the image forming apparatus 1 to transition from the activation state STC to the sleep state STD. The specific period TE is for example 10 minutes.

FIG. 7 is a flowchart depicting an example of a process performed by the controller 2 in response to receipt of a long pressing operation QPB.

As depicted in FIG. 7, the judgement section 203 determines in Step S201 whether or not the receiving section 201 has received the long pressing operation QPB.

Figure 9:
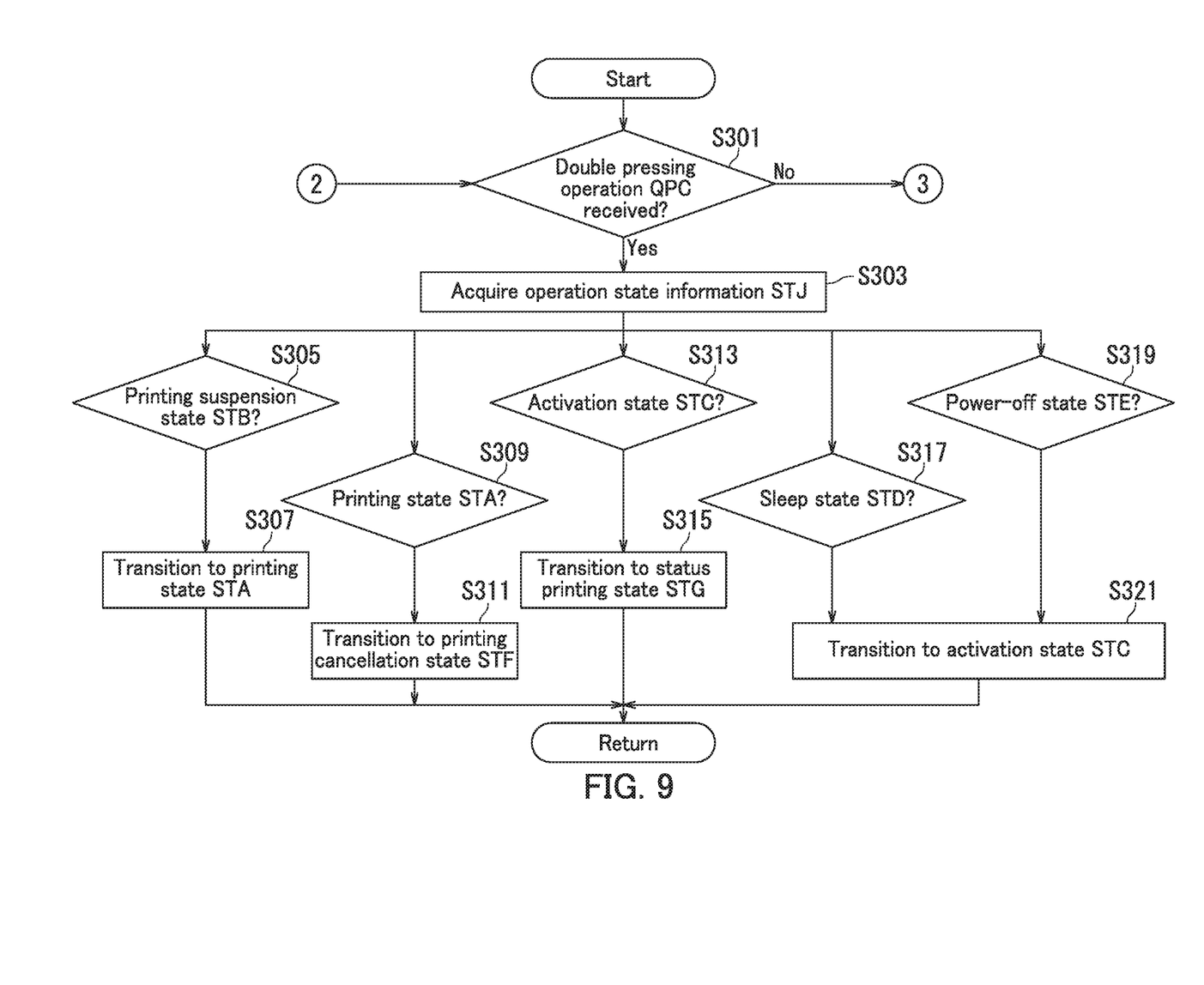
FIG. 9 is a flowchart depicting an example of a process performed by the controller.

When the judgement section 203 determines that the long pressing operation QPB has not been received (No in Step S201), the routine proceeds to Step S301 in FIG. 9. When the judgement section 203 determines that the long pressing operation QPB has been received (Yes in Step S201), the routine proceeds to Step S203.

In Step S203, the acquisition section 202 acquires the operation state information STJ from the operation controller 206 and the routine proceeds to Steps S205, S209, S213, S217, and S219. The operation state information STJ indicates the first operation state ST1.

In Step S205, the determination section 204 determines whether or not the first operation state ST1 is the printing state STA.

When the determination section 204 identifies the first operation state ST1 as the printing state STA, the routine proceeds to Step S207.

In Step S207, the determination section 204 determines the second operation state ST2 to be the printing suspension state STB and the transition section 205 causes the image forming apparatus 1 to transition from the printing state STA to the printing suspension state STB. The operation controller 206 performs the transition processing of causing the image forming apparatus 1 to transition from the printing state STA to the printing suspension state STB. The routine then returns to Step S201.

In Step S209, the determination section 204 determines whether or not the first operation state ST1 is the printing suspension state STB.

When the determination section 204 identifies the first operation state ST1 as the printing suspension state STB, the routine proceeds to Step S211.

In Step S211, the determination section 204 determines the second operation state ST2 to be the printing cancellation state STF and the transition section 205 causes the image forming apparatus 1 to transition from the printing suspension state STB to the printing cancellation state STF. The operation controller 206 performs transition processing of causing the image forming apparatus 1 to transition from the printing suspension state STB to the printing cancellation state STF. The routine then returns to Step S101.

In Step S213, the determination section 204 determines whether or not the first operation state ST1 is the activation state STC.

When the determination section 204 identifies the first operation state ST1 as the activation state STC, the routine proceeds to Step S215.

In Step S215, the determination section 204 determines the second operation state ST2 to be the power-off state STE and the transition section 205 causes the image forming apparatus 1 to transition from the activation state STC to the power-off state STE. The operation controller 206 performs the transition processing of causing the image forming apparatus 1 to transition from the activation state STC to the power-off state STE. The routine then returns to Step S201.

In Step S217, the determination section 204 determines whether or not the first operation state ST1 is the sleep state STD.

When the determination section 204 identifies the first operation state ST1 as the sleep state STD, the routine proceeds to Step S221.

In Step S221, the determination section 204 determines the second operation state ST2 to be the activation state STC and the transition section 205 causes the image forming apparatus 1 to transition from the sleep state STD to the activation state STC. The operation controller 206 performs the transition processing of causing the image forming apparatus 1 to transition from the sleep state STD to the activation state STC. The routine then returns to Step S201.

In Step S219, the determination section 204 determines whether or not the first operation state ST1 is the power-off state STE.

When the determination section 204 identifies the first operation state ST1 as the power-off state STE, the routine proceeds to Step S221.

In Step S221, the determination section 204 determines the second operation state ST2 to be the activation state STC and the transition section 205 causes the image forming apparatus 1 to transition from the power-off state STE to the activation state STC. The operation controller 206 performs the transition processing of causing the image forming apparatus 1 to transition from the power-off state STE to the activation state STC. The routine then returns to Step S201.

As described with reference to FIGS. 3 to 7, in the embodiment of the present disclosure, the determination section 204 determines the second operation state ST2 to be the printing suspension state STB when the first operation state ST1 is the printing state STA, and determines the second operation state ST2 to be the printing cancellation state STF when the first operation state ST1 is the printing suspension state STB. In the above configuration, transition from the printing state STA to the printing suspension state STB and transition from the printing suspension state STB to the printing cancellation state STF can be achieved through the long pressing operation QPB on the first switch SW1. Thus, user convenience can further be increased.

Moreover, the determination section 204 determines the second operation state ST2 to be the activation state STC when the first operation state ST1 is the power-off state STE, determines the second operation state ST2 to be the power-off state STE when the first operation state ST1 is the activation state STC, and determines the second operation state ST2 to be the activation state STC when the first operation state ST1 is the sleep state STD. In the above configuration, transition from the activation state STC to the power-off state STE, transition from the power-off state STE to the activation state STC, and transition from the sleep state STD to the activation state STC can be achieved through the long pressing operation QPB on the first switch SW1. Thus, user convenience can further be increased.

Alternate transitions between the activation state STC and the power-off state STE can be also achieved through the long pressing operation QPB on the first switch SW1. Thus, user convenience can further be increased. Moreover, transition from the sleep state STD to the activation state STC can be achieved through the long pressing operation QPB on the first switch SW1. When the controller 2 receives neither an operation nor a print job for the specific period TE in a situation in which the first operation state ST1 is the activation state STC, the controller 2 causes the image forming apparatus 1 to transition to the sleep state STD. In the above configuration, power dissipation by the image forming apparatus 1 can be effectively reduced.

Figure 8:
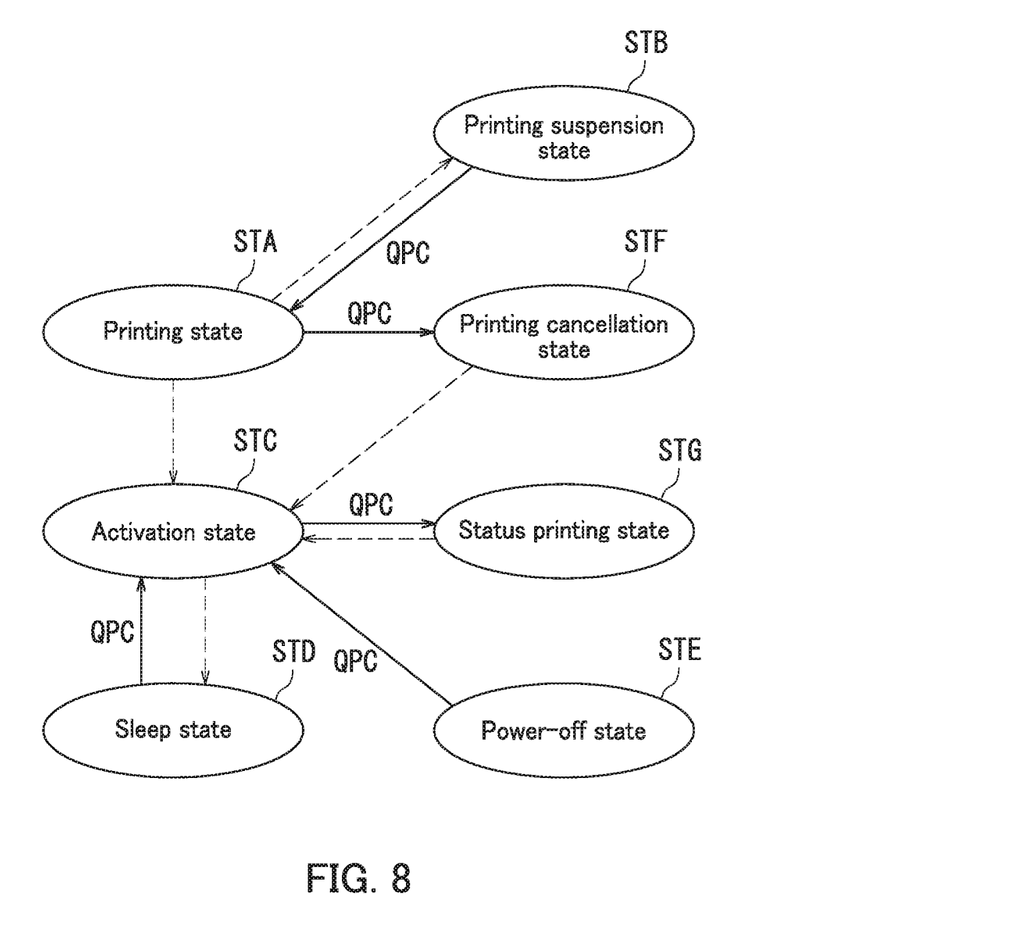
FIG. 8 is a transition diagram illustrating an example of transition of the operation state of the image forming apparatus.

The following further describes the configuration of the controller 2 with reference to FIGS. 3 to 9. FIG. 8 is a transition diagram illustrating an example of transition of the operation state of the image forming apparatus 1 in response to receipt of a double pressing operation QPC. The double pressing operation QPC is an operation in which the first switch SW1 is pressed two times within the specific period TA. The specific period TA is for example two seconds. The double pressing operation QPC is equivalent to an example of the second operation QP2.

As illustrated in FIG. 8, each of the first and second operation states ST1 and ST2 of the image forming apparatus 1 further includes a status printing state STG in addition to the printing state STA, the printing suspension state STB, the printing cancellation state STF, the activation state STC, the sleep state STD, and the power-off state STE illustrated in FIG. 6.

The status printing state STG is a state in which a list of main setting items for the image forming apparatus 1 is being printed. The setting items include a setting value (or setting state) for each of setting parameters. The setting parameters include for example a setting to monochrome printing or color printing, a setting to duplex printing or simplex printing, and a setting of an upper limit on the number of times of printing. In the status printing state STG electric power is supplied for example to the controller 2, the power source controller 3, the image forming section 14, and the fixing section 17.

Upon the receiving section 201 receiving the double pressing operation QPC in a situation in which the first operation state ST1 is the printing suspension state STB, the determination section 204 determines the second operation state ST2 to be the printing state STA. The transition section 205 then causes the image forming apparatus 1 to transition from the printing suspension state STB to the printing state STA. The operation controller 206 performs the transition processing of causing the image forming apparatus 1 to transition from the printing suspension state STB to the printing state STA.

Upon the controller 2 detecting occurrence of a jam in a situation in which the first operation state ST1 is the printing state STA, the controller 2 causes the image forming apparatus 1 to transition from the printing state STA to the printing suspension state STB. That is, the controller 2 performs the transition processing of causing the image forming apparatus 1 to transition from the printing state STA to the printing suspension state STB.

Upon the receiving section 201 receiving the double pressing operation QPC in a situation in which the first operation state ST1 is the printing state STA, the determination section 204 determines the second operation state ST2 to be the printing cancellation state STF. The transition section 205 then causes the image forming apparatus 1 to transition from the printing state STA to the printing cancellation state STF. The operation controller 206 performs transition processing of causing the image forming apparatus 1 to transition from the printing state STA to the printing cancellation state STF.

When a process of cancelling a print job in the printing cancellation state STF ends, the controller 2 causes transition from the printing cancellation state STF to the activation state STC. That is, the controller 2 performs transition processing of causing the image forming apparatus 1 to transition from the printing cancellation state STF to the activation state STC.

Upon an end of execution of the print job in a situation in which the first operation state ST1 is the printing state STA, the controller 2 causes the image forming apparatus 1 to transition from the printing state STA to the activation state STC. That is, the controller 2 performs the transition processing of causing the image forming apparatus 1 to transition from the printing state STA to the activation state STC.

Upon the receiving section 201 receiving the double pressing operation QPC in a situation in which the first operation state ST1 is the activation state STC, the determination section 204 determines the second operation state ST2 to be the status printing state STG. The transition section 205 then causes the image forming apparatus 1 to transition from the activation state STC to the status printing state STG. The operation controller 206 performs transition processing of causing the image forming apparatus 1 to transition from the activation state STC to the status printing state STG.

When a process of printing the list of the main setting items in the status printing state STG ends, the controller 2 causes the image forming apparatus 1 to transition from the status printing state STG to the activation state STC. That is, the controller 2 performs the transition processing of causing the image forming apparatus 1 to transition from the status printing state STG to the activation state STC.

Upon the receiving section 201 receiving the double pressing operation QPC in a situation in which the first operation state ST1 is the power-off state STE, the determination section 204 determines the second operation state ST2 to be the activation state STC. The transition section 205 then causes the image forming apparatus 1 to transition from the power-off state STE to the activation state STC. The operation controller 206 performs the transition processing of causing the image forming apparatus 1 to transition from the power-off state STE to the activation state STC.

Upon the receiving section 201 receiving the double pressing operation QPC in a situation in which the first operation state ST1 is the sleep state STD, the determination section 204 determines the second operation state ST2 to be the activation state STC. The transition section 205 then causes the image forming apparatus 1 to transition from the sleep state STD to the activation state STC. The operation controller 206 performs the transition processing of causing the image forming apparatus 1 to transition from the sleep state STD to the activation state STC.

When the controller 2 receives neither an operation nor a print job for a specific period TF in a situation in which the first operation state ST1 is the activation state STC, the controller 2 causes the image forming apparatus 1 to transition from the activation state STC to the sleep state STD. That is, the controller 2 performs the transition processing of causing the image forming apparatus 1 to transition from the activation state STC to the sleep state STD. The specific period TF is for example 10 minutes.

When the controller 2 receives neither an operation nor a print job for a specific period TG in a situation in which the first operation state ST1 is the sleep state STD, the controller 2 causes the image forming apparatus 1 to transition from the sleep state STD to the power-off state STE. That is, the controller 2 performs transition processing of causing the image forming apparatus 1 to transition from the sleep state STD to the power-off state STE. The specific period TG is for example 20 minutes.

FIG. 9 is a flowchart depicting an example of a process performed by the controller 2 in response to receipt of a double pressing operation QPC.

As depicted in FIG. 9, the judgement section 203 determines in Step S301 whether or not the receiving section 201 has received the double pressing operation QPC.

When the judgement section 203 determines that the double pressing operation QPC has not been received (No in Step S301), the routine returns to Step S101 in FIG. 5. When the judgement section 203 determines that the double pressing operation QPC has been received (Yes in Step S301), the routine proceeds to Step S303.

In Step S303, the acquisition section 202 acquires the operation state information STJ from the operation controller 206 and the routine proceeds to Steps S305, S309, S313. S317, and S319. The operation state information STJ indicates the first operation state ST1.

In Step S305, the determination section 204 determines whether or not the first operation state ST1 is the printing suspension state STB.

When the determination section 204 identifies the first operation state ST1 as the printing suspension state STB, the routine proceeds to Step S307.

In Step S307, the determination section 204 determines the second operation state ST2 to be the printing state STA and the transition section 205 causes the image forming apparatus 1 to transition from the printing suspension state STB to the printing state STA. The operation controller 206 performs the transition processing of causing the image forming apparatus 1 to transition from the printing suspension state STB to the printing state STA. The routine then returns to Step S301.

In Step S309, the determination section 204 determines whether or not the first operation state ST1 is the printing state STA.

When the determination section 204 identifies the first operation state ST1 as the printing state STA, the routine proceeds to Step S311.

In Step S311, the determination section 204 determines the second operation state ST2 to be the printing cancellation state STF and the transition section 205 causes the image forming apparatus 1 to transition from the printing state STA to the printing cancellation state STF. The operation controller 206 performs the transition processing of causing the image forming apparatus 1 to transition from the printing state STA to the printing cancellation state STF. The routine then returns to Step S301.

In Step S313, the determination section 204 determines whether or not the first operation state ST1 is the activation state STC.

When the determination section 204 identifies the first operation state ST1 as the activation state STC, the routine proceeds to Step S315.

In Step S315, the determination section 204 determines the second operation state ST2 to be the status printing state STG and the transition section 205 causes the image forming apparatus 1 to transition from the activation state STC to the status printing state STG. The operation controller 206 performs the transition processing of causing the image forming apparatus 1 to transition from the activation state STC to the status printing state STG. The routine then returns to Step S201.

In Step S317, the determination section 204 determines whether or not the first operation state ST1 is the sleep state STD.

When the determination section 204 identifies the first operation state ST1 as the sleep state STD, the routine proceeds to Step S321.

In Step S321, the determination section 204 determines the second operation state ST2 to be the activation state STC and the transition section 205 causes the image forming apparatus 1 to transition from the sleep state STD to the activation state STC. The operation controller 206 performs the transition processing of causing the image forming apparatus 1 to transition from the sleep state STD to the activation state STC. The routine then returns to Step S301.

In Step S319, the determination section 204 determines whether or not the first operation state ST1 is the power-off state STE.

When the determination section 204 identifies the first operation state ST1 as the power-off state STE, the routine proceeds to Step S321.

In Step S321, the determination section 204 determines the second operation state ST2 to be the activation state STC and the transition section 205 causes the image forming apparatus 1 to transition from the power-off state STE to the activation state STC. The operation controller 206 performs the transition processing of causing the image forming apparatus 1 to transition from the power-off state STE to the activation state STC. The routine then returns to Step S301.

As described with reference to FIGS. 3 to 9, in the embodiment of the present disclosure, the determination section 204 determines the second operation state ST2 to be the status printing state STG when the first operation state ST1 is the printing state STA and the transition section 205 causes the image forming apparatus 1 to transition from the activation state STC to the status printing state STG. In the above configuration, the list of the main setting items for the image forming apparatus 1 can be easily printed. Thus, user convenience can further be increased.

Moreover, the determination section 204 determines the second operation state ST2 to be the activation state STC when the first operation state ST1 is the power-off state STE, and determines the second operation state ST2 to be the activation state STC when the first operation state ST1 is the sleep state STD. In the above configuration, transition from the power-off state STE to the activation state STC and transition from the sleep state STD to the activation state STC can be achieved through the double pressing operation QPC on the first switch SW1. Thus, user convenience can further be increased.

When the controller 2 receives neither an operation nor a print job for the specific period TF in a situation in which the first operation state ST1 is the activation state STC, the controller 2 causes the image forming apparatus 1 to transition to the sleep state STD. When the controller 2 receives neither an operation nor a print job for the specific period TG in a situation in which the first operation state ST1 is the sleep state STD, the controller 2 causes the image forming apparatus 1 to transition to the power-off state STE. In the above configuration, power dissipation of the image forming apparatus 1 can be effectively reduced without need of user operation.

The embodiment of the present disclosure describes a case in which the selection section 207 selects the first operation QP1 and the second operation QP2, and the first operation QP1 is the pressing operation QPA while the second operation QP2 includes the long pressing operation QPB and the double pressing operation QPC. That is, the receiving section 201 receives three types of operation (pressing operation QPA, long pressing operation QPB, and double pressing operation QPC), which should not be taken to limit the present disclosure. For example, the selection section 207 may select the first operation QP1 and the receiving section 201 may receive only one type of operation (for example, the pressing operation QPA).

An embodiment of the present disclosure has been described with reference to the drawings. However, the present disclosure is not limited to the above embodiment and may be implemented in various different forms that do not deviate from the essence of the present disclosure (for example, as described below in sections (1) and (2)). The drawings schematically illustrate elements of configuration in order to facilitate understanding. Properties of the elements of configuration illustrated in the drawings, such as thickness, length, and quantity may differ from reality in order to aid preparation of the drawings. Furthermore, properties of the elements of configuration described in the above embodiment, such as shapes and dimensions, are merely examples and are not intended as specific limitations. Various alterations may be made so long as there is no substantial deviation from the configuration of the present disclosure.

(1) As described with reference to FIG. 1, the image forming apparatus 1 is a printer in the embodiment of the present disclosure, which should not be taken to limit the present disclosure. The image forming apparatus 1 only needs to include the image forming section 14. For example, the image forming apparatus 1 may be a multifunction peripheral.

(2) As described with reference to FIGS. 1 and 2, the image forming apparatus 1 in the embodiment of the present disclosure includes the first switch SW1 and the second switch SW2, which should not be taken to limit the present disclosure. The image forming apparatus 1 only needs to include the first switch SW1.

What is claimed is:

1. An image forming apparatus comprising:
a key;
a receiving section configured to receive operation on the key;
an acquisition section configured to acquire operation state information indicating a first operation state;
a determination section configured to determine a second operation state based on the operation state information, the second operation state differing from the first operation state; and
a transition section configured to cause the image forming apparatus to transition from the first operation state to the second operation state in response to the operation on the key, wherein
the first operation state is a state in which the image forming apparatus is operating, and the second operation state is a state in which the image forming apparatus is to operate,
each of the first operation state and the second operation state includes a printing state and a printing suspension state,
when the first operation state is the printing state, the determination section determines the second operation state to be the printing suspension state,
when the first operation state is the printing suspension state, the determination section determines the second operation state to be the printing state,
the printing state is a state in which the image forming apparatus is executing a print job, and
the printing suspension state is a state in which the image forming apparatus is restricted from executing the print job.

2. The image forming apparatus according to claim 1, wherein
each of the first operation state and the second operation state further includes an activation state and a sleep state,
when the first operation state is the activation state, the determination section determines the second operation state to be the sleep state, and
when the first operation state is the sleep state, the determination section determines the second operation state to be the activation state.

3. The image forming apparatus according to claim 1, wherein
each of the first operation state and the second operation state further includes an activation state, a sleep state, and a power-off state,
when the first operation state is the power-off state, the determination section determines the second operation state to be the activation state,
when the first operation state is the activation state, the determination section determines the second operation state to be the power-off state, and
when the first operation state is the sleep state, the determination section determines the second operation state to be the activation state.

4. The image forming apparatus according to claim 1, further comprising
a power switch differing from the key, wherein
the key switches on and off electric power supply, and
when the power switch is turned off, electric power supply to the image forming apparatus is restricted.

5. The image forming apparatus according to claim 1, wherein
each of the first operation state and the second operation state further includes a sleep state, and a power-off state,
when the first operation state is the sleep state, the determination section determines the second operation state to be the power-off state.

6. An image forming apparatus comprising:
a key;
a receiving section configured to receive operation on the key;
an acquisition section configured to acquire operation state information indicating a first operation state;
a determination section configured to determine a second operation state based on the operation state information, the second operation state differing from the first operation state; and
a transition section configured to cause the image forming apparatus to transition from the first operation state to the second operation state in response to the operation on the key, wherein the first operation state is a state in which the image forming apparatus is operating, and the second operation state is a state in which the image forming apparatus is to operate, each of the first operation state and the second operation state includes a printing state and a printing suspension state, when the first operation state is the printing state, the determination section determines the second operation state to be the printing suspension state, when the first operation state is the printing suspension state, the determination section determines the second operation state to be the printing state, the printing state is a state in which the image forming apparatus is executing a print job, the printing suspension state is a state in which the image forming apparatus is restricted from executing the print job, the operation on the key includes a first operation and a second operation, the image forming apparatus further comprises a judgement section configured to judge whether the operation on the key is the first operation or the second operation, the determination section determines the second operation state based on the operation state information and a result of judgement by the judgement section, and the second operation differs from the first operation in at least one of a number of times of the operation on the key within a specific period and duration for which the key is continuously operated.

7. The image forming apparatus according to claim 6, wherein the number of times of the operation on of the key within the specific period is two or more in the second operation.

8. The image forming apparatus according to claim 6, wherein the duration for which the key is continuously operated is two seconds or longer in the second operation.

9. The image forming apparatus according to claim 6, further comprising a selection section configured to select at least one operation of the first operation and the second operation, wherein the receiving section receives the at least one operation selected by the selection section.

* * * * *